US009227262B2

United States Patent

Wiryadinata et al.

(10) Patent No.: US 9,227,262 B2

(45) Date of Patent: Jan. 5, 2016

(54) POWER SOURCE FOR REDUCING ELECTROMAGNETIC INTERFERENCE AND POWER CONSUMPTION

(71) Applicant: Illinois Tool Works Inc., Glenview, IL (US)

(72) Inventors: Indra B. Wiryadinata, Appleton, WI (US); Mark A. Ulrich, New London, WI (US); Charles L. Kaufman, Appleton, WI (US)

(73) Assignee: ILLINOIS TOOL WORKS INC., Glenview, IL (US)

( * ) Notice: Subject to any disclaimer, the term of this patent is extended or adjusted under 35 U.S.C. 154(b) by 309 days.

(21) Appl. No.: 13/793,161

(22) Filed: Mar. 11, 2013

(65) Prior Publication Data

US 2014/0251965 A1 Sep. 11, 2014

(51) Int. Cl.
*B23K 9/095* (2006.01)
*B23K 9/10* (2006.01)

(52) U.S. Cl.
CPC ............. *B23K 9/0953* (2013.01); *B23K 9/1006* (2013.01)

(58) Field of Classification Search
CPC ............. B23K 9/095; B23K 9/12; B23K 9/10
USPC ................................. 219/132, 130.31, 130.1
See application file for complete search history.

(56) References Cited

U.S. PATENT DOCUMENTS 5,601,741 A 2/1997 Thommes
6,153,855 A * 11/2000 Renner et al. ................. 219/133
6,329,636 B1 12/2001 Geissler
2005/0230372 A1* 10/2005 Ott ................................ 219/132

FOREIGN PATENT DOCUMENTS

EP 1586403 10/2005

OTHER PUBLICATIONS

International Search Report from PCT application No. PCT/US2014/015639, dated Jul. 3, 2014, 9 pgs.

* cited by examiner

*Primary Examiner* — Brian Jennison
(74) *Attorney, Agent, or Firm* — Fletcher Yoder P.C.

(57) ABSTRACT

A welding power source configured to receive an input power includes a plurality of components and supervising circuitry configurable in a plurality of modes. The plurality of components include power conversion circuitry and background power supply. The supervising circuitry is configured to distribute the input power to the plurality of components based at least in part on a mode of the plurality of modes. The plurality of modes include a welding mode configured to distribute the input power to the power conversion circuitry and to the background power supply. The plurality of modes also include a monitoring mode configured to distribute the input power to the background power supply, and to not distribute the input power to the power conversion circuitry.

20 Claims, 4 Drawing Sheets

POWER SOURCE FOR REDUCING ELECTROMAGNETIC INTERFERENCE AND POWER CONSUMPTION

BACKGROUND

The invention relates generally to welding systems, and, more particularly to welding power sources for reducing electromagnetic interference and power consumption.

Many types of welding power sources capable of providing a welding power from an alternating current (AC) or a direct current (DC) input power source have been developed. Typically, such welding power sources are configured to provide welding power to a torch for a welding process, such as a shielded metal arc welding (SMAW) operation, a tungsten inert gas welding (TIG) operation, a gas metal arc welding (GMAW) or metal inert gas welding (MIG) operation. Power conversion circuitry may convert the input power to welding power during the welding process. Welding power sources may also be configured to provide the input power to welding accessories and to other accessories. These welding accessories and other accessories may receive power from one or more power supplies within the welding power source. Unfortunately, the power conversion circuitry utilizes power and has power losses (e.g., heat, noise) whenever the power conversion circuitry is turned on. The power supplies also utilize power and have power losses when turned on, regardless of whether the power output is presently utilized by the welding accessories and other accessories. Moreover, some power supplies may cause electromagnetic interference when turned on. Reducing the electromagnetic interference with filter boards may add weight, bulk, and/or complexity to a welding power source.

BRIEF DESCRIPTION

In one embodiment, a welding power source configured to receive an input power includes a plurality of components and supervising circuitry configurable in a plurality of modes. The plurality of components includes power conversion circuitry and a background power supply. The supervising circuitry is configured to distribute the input power to the plurality of components based at least in part on a mode of the plurality of modes. The plurality of modes includes a welding mode configured to distribute the input power to the power conversion circuitry and to the background power supply. The plurality of modes also includes a monitoring mode configured to distribute the input power to the background power supply, and to not distribute the input power to the power conversion circuitry.

In another embodiment, a welding system includes a welding torch configured to transmit a weld signal based at least in part on a demand for a weld process, and a welding power source configured to receive an input power. The welding power source includes power conversion circuitry configured to receive the input power as a weld input and to convert the weld input into weld power when turned on. The weld power is provided to the welding torch. The welding power source also includes a background power supply and supervising circuitry. The background power supply is configured to convert the input power into background power to provide to control circuitry when turned on and is configured to control the power conversion circuitry. The supervising circuitry is configurable in a plurality of modes based at least in part on the weld signal. The plurality of modes includes a welding mode configured to turn on the power conversion circuitry and to turn on the background power supply, and a monitoring mode configured to turn off the power conversion circuitry and to turn on the background power supply.

In another embodiment, a method of operating a welding power source includes entering a welding mode of supervising circuitry of the welding power source and utilizing the weld power for a weld process. The welding mode includes providing weld input to power conversion circuitry to turn on the power conversion circuitry that converts the weld input into weld power for the weld process. The welding mode also includes providing background power to background circuitry. The method also includes starting a timer when an operator stops utilizing the weld power for the weld process, and entering a monitoring mode of the supervising circuitry when a value of the timer is approximately greater than or equal to a welding delay. The monitoring mode includes providing power to the background circuitry and turning off the power conversion circuitry.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Presently contemplated embodiments of a welding power source include supervising circuitry to control a distribution of input power to power conversion circuitry and power supplies within the welding power source. A power supply may receive a portion of the input power and convert the portion into a form with properties (e.g., voltage, current, frequency) suitable for components coupled to the power supply. The supervising circuitry may distribute the input power in various forms including, but not limited to, weld power, background power, accessory power, and welding accessory power. Some of the input power may be lost to the components due to losses (e.g., heat, noise, power factor) within the power supply. The supervising circuitry may distribute the input power to the power conversion circuitry and/or to power supplies on-demand to reduce power consumption due to losses. That is, the supervising circuitry may distribute input power to the power conversion circuitry when an operator actuates a trigger on a welding torch, and the supervising circuitry may turn off the power conversion circuitry when the operator releases the trigger. The supervising circuitry may stop distributing (e.g., turn off) the input power to any power supply that is not converting the input power for active use, such as when a fan, light, tool, or motor is no longer utilized. Turning off a power supply and/or the power conversion circuitry within the welding power source may reduce the electromagnetic interference (EMI) signature of the welding power source without using filter boards. Turning off a power supply and/or the power conversion circuitry may also reduce thermal stresses and/or load stresses on components of the welding power source.

Figure 1:
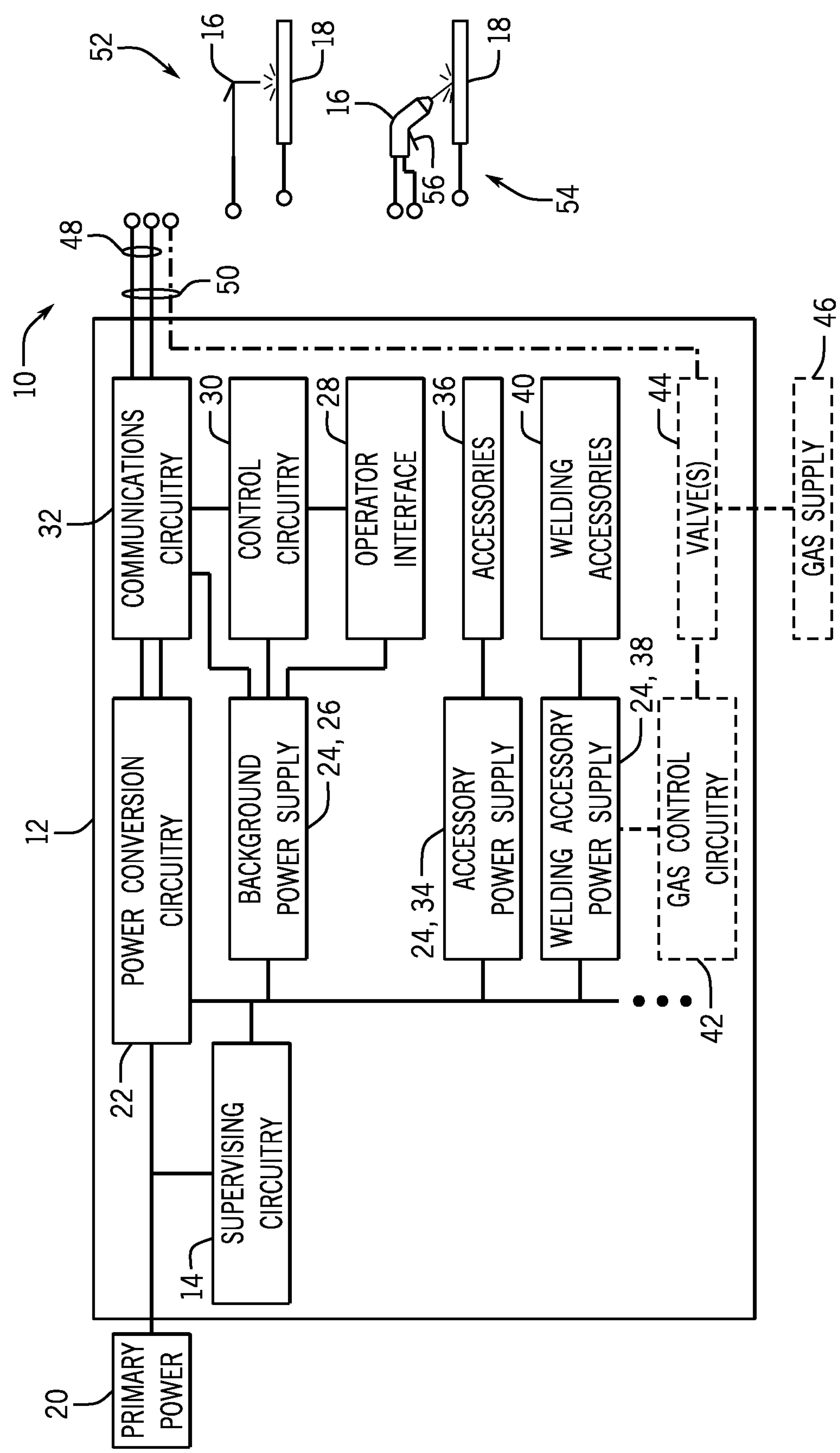
FIG. 1 is a block diagram of a welding system having a welding power source with supervising circuitry in accordance with aspects of the present disclosure.

Turning now to the figures, FIG. 1 is a block diagram of a welding system 10 which powers, controls, and provides supplies to a welding operation. The welding system 10 includes a welding power source 12, supervising circuitry 14, a torch 16, and a workpiece 18. The welding power source 12 receives primary power 20 (e.g., from the AC power grid, an engine/generator set, a battery, or a combination thereof) and conditions the input power to provide weld power to one or more welding devices in accordance with demands of the system. The primary power 20 may be supplied from another location (e.g., a wall outlet). The welding power source 12 includes power conversion circuitry 22 that may include circuit elements such as transformers, switched-mode power supplies (e.g., boost converters, buck converters), rectifiers, switches, filters, and so forth, capable of converting the AC input power to a DCEP or DCEN output as dictated by the demands and settings of the system 10. In some embodiments, the power conversion circuitry 22 may include a generator, such as a generator and rectifier to produce DC output. Such circuits are generally known in the art.

In some embodiments, the welding power source 12 may be adapted to receive input power directly from a wall outlet and direct the input power to devices within the welding power source 12. Moreover, the power conversion circuitry 22 may be capable of receiving any input voltage over a wide range of input voltages (e.g., approximately 5 V to 900 V) and converting the input power into a weld power suitable for welding operations. The welding power source 12 may be connected to primary powers 20 with different voltages without affecting the capability of the supervising circuitry 14 to reduce electromagnetic interference and/or reduce power consumption as described below.

The welding power source 12 may include one or more power supplies 24 capable of converting the input power from the primary power 20 into a suitable form of power. For example, a background power supply 26 may provide background power for background circuitry, such as an operator interface 28, control circuitry 30, and communications circuitry 32. An accessory power supply 34 may provide accessory power to accessories 36, including, but not limited to switches, lights, tools, motors, electronic devices (e.g., laptop computer, tablet computer, mobile phone, audio system) or auxiliary devices, or any combination thereof. In some embodiments, a welding power supply 38 may provide welding accessory power to welding accessories 40, such as heaters, cooling systems, wire feeders, gas control circuitry 42, valves 44 coupled to a gas supply 46, or any combination thereof. In some embodiments, the welding power source 12 may include additional power supplies 24, such as a second welding accessory power supply 38. In alternative embodiments, a power supply 24 (e.g., accessory power supply 34) may provide power to accessories 26 and welding accessories 40.

Regarding the background circuitry, the control circuitry 30 controls the operations of the power conversion circuitry 22 of the welding power source 12 based at least in part on input received through the operator interface 28. In some embodiments, the control circuitry 30 may control some operations of the other power supplies 24 based at least in part on input received through the operator interface 28. An operator may choose a weld process via the operator interface 28 and input desired parameters (e.g., voltage, current, particular pulsed or non-pulsed welding regime, active accessories, and so forth). The control circuitry 28 may also be configured to receive and process a variety of inputs regarding the performance and demands of the system 10. Furthermore, the control circuitry 28 may include volatile or non-volatile memory, such as ROM, RAM, magnetic storage memory, optical storage memory, or a combination thereof. In addition, a variety of control parameters may be stored in the memory along with code configured to provide a specific output (e.g., initiate wire feed, enable gas flow, etc.) during operation. The communications circuitry 32 may communicate data between the welding power source 12 and the torch 16. The communications circuitry 32 conditions the data from the control circuitry 30 for communication to other welding devices, such as an external wire feeder or a pendant.

The welding power source 12 provides weld power to the torch 14 via a weld cable 48. In some embodiments, an integrated weld cable 50 may supply weld power and gas, such as for a TIG weld process or a MIG weld processes. In a welding system 10 coupled to a torch 16 set up as a SMAW system 52, the supervising circuitry 14 may stop distributing input power to the second power supply 38 (e.g., turn off the second power supply 38) because the welding accessories are not used during the SMAW weld process. In a welding system 10 coupled to a torch 16 set up as a TIG or MIG system 54, the supervising circuitry 14 distributes the input power to the first and the second power supplies 34, 38 based at least in part on a mode of the supervising circuitry 14. For example, upon receiving a weld signal, the supervising circuitry 14 in a weld mode distributes input power to the power conversion circuitry 22 as weld input to convert into weld power for performing the welding process. In some embodiments, actuating a trigger 56 of the torch 16 transmits the weld signal. The supervising circuitry 14 in the welding mode also distributes input power to at least some of the power supplies 24. In some modes, such as an accessory mode, the supervising circuitry 14 distributes input power to some power supplies 24 (e.g., background power supply 26) to turn them on, while turning off other power supplies (e.g., second power supply 38) and the power conversion circuitry 22. The input power distribution by the supervising circuitry 14 in each mode may be adjusted through the operator interface 28.

Figure 2:
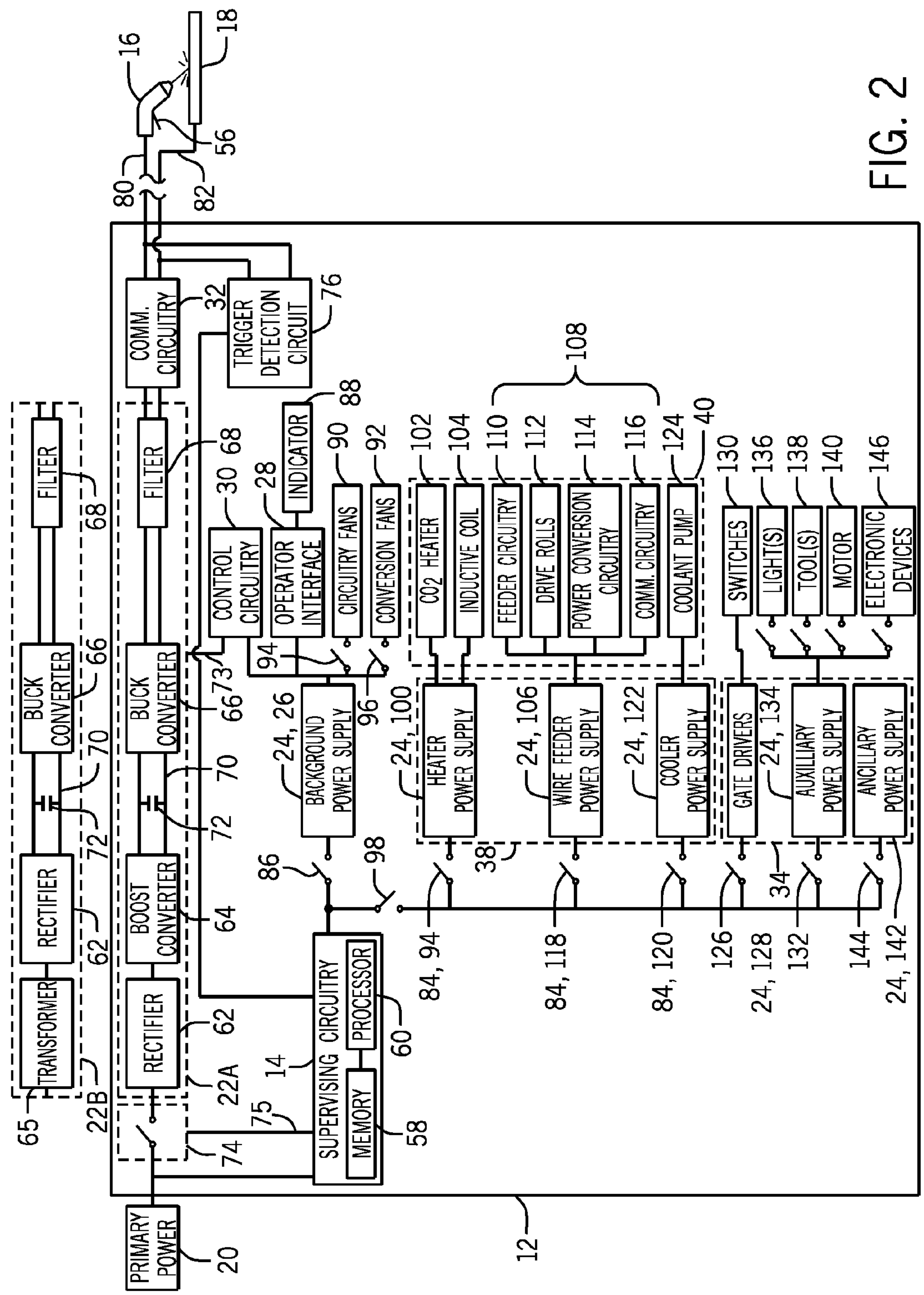
FIG. 2 is a block diagram of an embodiment of the welding power source and supervising circuitry coupled to power conversion circuitry and power supplies, in accordance with aspect of the present disclosure.

FIG. 2 illustrates a block diagram of the welding power source 12 with the supervising circuitry 14. The supervising circuitry 14 is shown coupled to the power conversion circuitry 22 and power supplies 24 by a series of switches to illustrate an embodiment of how the supervising circuitry 14 may distribute input power in various modes to turn on and to turn off the power supplies 24. For example, closing a switch turns a component on, whereas opening a switch turns a component off. The supervising circuitry 14 may include a memory 58 and a processor 60. The memory 58 may store code and/or instructions read by the processor 60 to determine the mode of the welding power source 12 and where the input power should be distributed. For example, in a welding mode, the supervising circuitry 14 may distribute the input power to the power conversion circuitry 22, to the background power supply 26, to accessory power supplies 34, and to welding accessory power supplies 38. In an accessory mode, the supervising circuitry 14 may distribute the input power to the background power supply 26 and to the accessory power supplies 34, but not to the power conversion circuitry 22 or to the welding accessory power supplies 38. In the accessory mode, the supervising circuitry 14 turns off the power conversion circuitry 22 and welding accessory power supplies 38. In some embodiments of a monitoring mode, the supervising circuitry 14 distributes input power only to the background power supply 26, and turns off the power conversion circuitry 22, the accessory power supplies 34, and the welding accessory power supplies 38. In other embodiments of the monitoring mode, the supervising circuitry 14 distributes the input power to the background power supply 26 and to the accessory power supplies 34 for a subset of accessories, such as accessories selected through the operator interface 28.

In the welding mode, a first type of power conversion circuitry 22A may convert the welding input into weld power using one or more rectifiers 62, switched-mode power supplies (e.g., a boost converter 64, a buck converter 66), one or more filters 68, or any combination thereof. The rectifier 62 may convert AC current to DC current, and the boost converter 64 may increase the voltage of the DC current supplied to an internal bus 70. A bus capacitor 72 may be placed on the internal bus 70 between the boost converter 64 and the buck converter 66 to accommodate bus voltage variations. In some embodiments, the boost converter 66 may raise the voltage to approximately 940 V, approximately 700 V, or approximately 500 V. The buck converter 66 may decrease the voltage of the DC current to the desired voltage for the weld power. The control circuitry 30 controls the current and voltage of the weld power by controlling the boost converter 64 and the buck converter 66 based at least in part on weld settings (e.g., MIG, TIG) and welding transfer mode (e.g., short circuit or regulated metal deposition (RMD), spray, pulsed spray, and so forth). The weld settings and/or welding transfer mode may be selected through the operator interface 28. The control circuitry 30 controls the first type of power conversion circuitry 22A via a control line 73

In some embodiments, a second type of power conversion circuitry 22B may be within the welding power source 12. The second type of power conversion circuitry 22B converts the welding input into weld power using a transformer 65, a rectifier 62, a buck converter 66, and one or more filters 68, or any combination thereof. The transformer 65 steps down the primary AC voltage to a nominal voltage that is processed by the rectifier 62, buck converter 66, and filter 68 into the weld power. The control circuitry 30 controls the current and voltage of the weld power by controlling the buck converter 66 via the control line 73 based at least in part on weld settings and welding transfer mode. The supervising circuitry 14 may control a weld switch 74 via a control line 75 to connect (i.e., turn on) or to disconnect (i.e., turn off) the power conversion circuitry 22B from the primary power 20. In some embodiments, the rectifier 62 and buck converter 66 together form a silicon controlled rectifier (SCR) to control the weld output. In some embodiments, the SCR does not have the capacitor 72. As discussed herein, control of the power conversion circuitry 22 includes, but is not limited to, the first type of power conversion circuitry 22A and the second type of power conversion circuitry 22B.

The power conversion circuitry 22 may lose a portion of the weld input in the conversion to weld power. For example, transformers, resistors, inductors, and capacitors, may dissipate some of the weld input as heat. Switched-mode power supplies in the boost converter 64 and the buck converter 66 regulate the weld power by switching on and off. Some of the weld input dissipates as switching losses. Switching of the boost converter 64 and buck converter 66 may produce electromagnetic interference (EMI) while converting the weld input to weld power. Power conversion circuitry 22 may utilize up to approximately 25 W, 100 W, 300 W, 600 W, or more of the weld input to convert the weld input to weld power even when the weld power is not utilized in a weld processes.

During a weld process where the weld power is utilized by the welding torch, the supervising circuitry 14 in the welding mode closes the weld switch 74 via the control line 75 to turn on the power conversion circuitry 22 and to distribute the input power to the power conversion circuitry 22 as weld input. The supervising circuitry 14 may turn off the power conversion circuitry 22 in the accessory mode and monitoring mode when the weld power is not utilized by opening the weld switch 74 to stop the distribution of input power as weld input to the power conversion circuitry 22. Upon demand (e.g., actuating the trigger 56), the supervising circuitry 14 may re-enter the welding mode and close the weld switch 74 to resume distributing the weld input to the power conversion circuitry 22. In some embodiments, the welding power source 12 includes a trigger detection circuit 76 separate from or included within the supervising circuitry 14. The torch 16 may transmit a weld signal, indicating demand for weld power, to the trigger detection circuit 76 upon actuating the trigger 56. In some embodiments, the weld signal may persist for a time up to a weld delay after releasing the trigger 56, thereby maintaining the supervising circuitry 14 in the welding mode. The weld delay may be less than approximately 10 seconds, 30 seconds, 1 minute, 5 minutes, or 15 minutes. A relatively long weld delay may reduce frequent switching between modes of the supervising circuitry 14, and a relatively short weld delay may reduce power consumption and EMI emission.

In some embodiments, the weld signal may be a change in voltage or a short circuit between the weld electrode 80 through the torch 16 and the work electrode 82. Upon receiving the weld signal from the torch 16, the supervising circuitry 14 may transition to the welding mode by closing the weld switch 74 via the control line 75 so that the operator may begin the weld process with the torch 16. In some embodiments, the power conversion circuitry 22 may charge for a charge delay prior to converting weld input to weld power suitable for the weld process. The charge delay may be up to approximately 25 ms, 50 ms, 100 ms, 150 ms, or 200 ms. In some embodiments, the duration of the charge delay is approximately imperceptible to the operator. The supervising circuitry 22 may also close one or more welding accessory switches 84 to distribute welding accessory power to the welding accessories 40 in response to receiving the weld signal. The welding accessories 40 may charge within the charge delay to enable the welding accessories to be utilized concurrently with the weld process. Through the trigger detection circuit 76, the supervising circuitry 14 may transition to the welding mode on demand from the accessory mode or monitoring mode. The supervising circuitry 14 in the accessory mode and the monitoring mode opens the weld switch 74 via the control line 75 to turn off the power conversion circuitry 22 and to reduce the power consumption and EMI of the power conversion circuitry 22. The relatively short charge delay enables the operator to resume a weld process on demand without waiting a significant amount of time greater than the charge delay.

In the welding mode, the accessory mode, and the monitoring mode, the supervising circuitry 14 may close the background switch 86 to turn on and to distribute input power to the background power supply 26. The background power supply 26 converts the input power to background power that enables the control circuitry 30 to control the power conversion circuitry 22 and other components of the welding power source 12 in the welding mode, the accessory mode, or the monitoring mode. An indicator 88 of the operator interface 28 may indicate the current mode of the supervising circuitry 14. The operator interface 28 may enable the operator to adjust weld settings and/or weld transfer mode. In some embodiments, the background power supply 26 may provide background power to circuitry fans 90 and/or to conversion fans 92. The circuitry fans 90 may circulate air to cool circuitry components, such as the supervising circuitry 14, the background power supply 26, the operator interface 28, and/or the control circuitry 30. The conversion fans 92 may be used to cool the power conversion circuitry 22.

In some embodiments, the supervising circuitry 14 closes a circuitry fan switch 94 to cool the circuitry components in the welding, idle, and monitoring modes to a suitable operating temperature and open the circuitry fan switch 94 when an operating temperature is below the suitable operating temperature. In some embodiments, the supervising circuitry 14 in the welding mode and the accessory mode closes a conversion fan switch 96 to cool the power conversion circuitry 22 with the conversion fans 92. The supervising circuitry 14 in the monitoring mode may open the conversion fan switch 96 to reduce utilization of the background power.

The welding power source 12 may include one or more welding accessory power supplies 38. The supervising circuitry 14 may distribute the input power to the welding accessory power supplies 38 and the accessory power supplies 34 by closing the accessory switch 98. In some embodiments, the supervising circuitry 14 may close a heater switch 99 to distribute input power to turn on a heater power supply 100. The heater power supply 100 may convert the input power into welding accessory power for a $CO_2$ heater 102 and/or an inductive coil 104. The $CO_2$ heater 102 may receive welding accessory power in the welding mode and/or the accessory mode to warm the $CO_2$ and maintain a regular flow of shielding gas to the torch 16. In some embodiments, the inductive coil 104 may receive welding accessory power in the welding mode and the accessory mode to warm the work piece 18 for a welding operation.

A wire feeder power supply 106 may convert the input power into welding accessory power for one or more of wire feeder elements 108 that include feeder circuitry 110 and drive rolls 112. In some embodiments, the wire feeder elements 108 are within the welding power source 12. In some embodiments, the wire feeder elements 108 include the feeder circuitry 110 and drive rolls 112 with power conversion circuitry 114 and/or communications circuitry 116, such as in an advanced process wire feeder. In some embodiments, the supervising circuitry 14 may close a feeder switch 118 only in the welding mode to distribute input power to the wire feeder power supply 106. Alternatively, the supervising circuitry 14 in the welding mode and the accessory mode may close the welding switch 118 to distribute input power to and to turn on the wire feeder power supply 106. The feeder circuitry 110 and drive rolls 112 may supply wire to the torch 16 in response to the weld signal for a weld process. The supervising circuitry 14 in the monitoring mode may open the wire feeder switch 118 to reduce the power consumption and/or EMI of the welding power source 12 when not performing a welding operation.

In some embodiments, the supervising circuitry 14 may close a cooler switch 120 to distribute input power to and to turn on a cooler power supply 122. The cooler power supply 122 may convert the input power into welding accessory power for a coolant pump 124. The coolant pump 124 may receive welding accessory power in the welding mode and/or the accessory mode to circulate coolant to a component (e.g., the inductive coil 104, the power conversion circuitry 22, a motor) to maintain the component below a threshold temperature. In some embodiments, the supervising circuitry 14, in the accessory mode of the welding mode, may open the cooler switch 120 to turn off the cooler power supply 122 when the component is below the threshold temperature. The supervising circuitry 14 in the monitoring mode may open the cooler switch 120 to reduce the power consumption and/or EMI of the welding power source 12 when not performing a welding operation.

The supervising circuitry 14 may close a gate driver switch 126 to distribute input power to and to turn on a gate driver 128. The gate driver 128 may convert the input power into accessory power for one or more switches 130 within the welding power source 12. The control circuitry 30 may control the gate drivers 128 and switches based at least in part on operator inputs received via the operator interface 28. In some embodiments, the supervising circuitry 14 in the monitoring mode may open the gate driver switch 126 to reduce the power consumption and/or EMI of the welding power source 12. The supervising circuitry 14, in the accessory mode or the welding mode, may open and close the gate driver switch 126 based at least in part on the weld settings, weld transfer mode, operator input, or instructions stored in memory 48, or any combination thereof.

In some embodiments, the supervising circuitry 14 may close an auxiliary switch 132 to distribute input power to and to turn on an auxiliary power supply 134. The auxiliary power supply 134 may convert the input power into accessory power for accessories such as one or more lights 136, one or more tools 138 (e.g., grinder, saw, drill), a motor 140, or an electronic device 146, or any combination thereof. Lights 136 may be used to illuminate a work area around the work piece 18, or for safety lighting. The supervising circuitry 14 may close the auxiliary switch 132 in the welding mode and/or the accessory mode to turn on the lights 136, tools 138, motor 140, or other accessories. In some embodiments, the supervising circuitry 14 in the monitoring mode may open the auxiliary switch 132 to reduce the power consumption and/or the EMI of the welding power source 12 while not performing a welding operation. In some embodiments, the supervising circuitry may control the auxiliary power supply 134 to distribute the auxiliary power to some accessories (e.g., lights 136) and not to other accessories (e.g., tools 138) based at least in part on instructions in memory 58 or operator input received via the operator interface 28.

The welding power source 12 may include additional power supplies, such as the ancillary power supply 142 to distribute the input power as accessory power to other accessories that may be used with a welding operation. The supervising circuitry 14 may close an ancillary switch 144 in the welding mode and/or the accessory mode to turn on the ancillary power supply 142. The supervising circuitry 14 may open the ancillary switch 144 in the monitoring mode to turn off the ancillary power supply 142. Opening the ancillary switch 144 in the monitoring mode may reduce the power consumption and/or the EMI of the welding power source 12 while not performing a welding operation.

The supervising circuitry 14 may control the distribution of the input power in different modes by controlling the weld switch 74, the background switch 86, the accessory switch 98, the heater switch 94, the wire feeder switch 118, the cooler switch 120, the gate driver switch 126, the auxiliary switch 132, and the ancillary switch 144. Opening a switch turns the connected components off, and closing a switch turns the connected components on. The supervising circuitry 14 may be set in one of at least three modes: the welding mode, the accessory mode, and the monitoring mode. The supervising circuitry 14 may close the background switch 86 in each of the welding, idle, and monitoring modes.

In the welding mode, the supervising circuitry 14 may close at least the weld switch 74 and appropriate welding accessory switches 84 to enable the operator to perform the weld process. For example, the supervising circuitry 14 may distribute the input power to the power conversion circuitry 22 and to the wire feeder power supply 106 to enable the torch 16 to perform a MIG welding operation. In some embodiments, the supervising circuitry 14 in the welding mode may distribute the input power as accessory power to the auxiliary power supply 134 to enable lights 136 to illuminate the work piece 18. In the welding mode, the control circuitry 30 may control the power conversion circuitry 22 and control the circuitry and conversion fans 90, 92 to cool the components of the welding power source 12.

In the accessory mode, the supervising circuitry 14 may open at least the weld switch 74 to turn off the power conversion circuitry 22. In some embodiments, the supervising circuitry 14 may remain in the welding mode for at least a welding delay period after the weld process stops or until the weld signal stops. The welding delay period may be adjustable via the operator interface 28. The welding delay period may be less than or equal to approximately 10 seconds, 30 seconds, 1 minute, 5 minutes, or 15 minutes. Remaining in the welding mode for the welding delay period may substantially reduce the time before the welding operation may resume upon actuation of the trigger 56 because the power conversion circuitry 22 remains charged. In other embodiments, the supervising circuitry 14 may enter the accessory mode or monitoring mode immediately after the weld signal stops.

The supervising circuitry 14 in the accessory mode may turn on or turn off the welding accessories and other accessories based at least in part on settings that may be established via the operator interface 28 and/or instructions stored in memory 58. For example, operator inputs received via the operator interface 28 may designate the heater power supply 100 and auxiliary power supply 132 in addition to the background power supply 26 to remain operational in accessory mode. Accordingly, when the operator stops the welding operation, the supervising circuitry 14 enters the accessory mode after the weld delay and opens the weld switch 74, the wire feeder switch 118, the cooler switch 122, the gate driver switch 126, and the ancillary switch 144, but not the heater switch 99 or the auxiliary switch 132.

In another example, instructions stored in memory 58 direct the supervising circuitry 14 in accessory mode to open the weld switch 74 and welding accessory switches 84. The instructions may direct the supervising circuitry 14 to continue distributing input power to only accessories (e.g., lights 136) that are drawing the accessory power when the supervising circuitry 14 enters the accessory mode. As a further example, instructions stored in memory 58 may direct the supervising circuitry 14 to turn off all the power supplies 24 except for the background power supply 26 and the cooler power supply 120 that operate to cool components of the welding power source 12. When the components are sufficiently cooled, the supervising circuitry 14 may turn off the cooler power supply 120, thereby reducing power consumption by the welding power source 12 and/or reducing EMI.

The supervising circuitry 14 transitions between modes in different orders based at least in part on the current application of the welding power source 12. In some situations, the operator may form welds intermittently with relatively long periods between welds. In other situations, the operator may form many welds in a short period of time with relatively small periods between welds. The supervising circuitry 14 may enable the welding power source 12 to reduce power consumption and/or EMI by turning off power supplies 24 and the power conversion circuitry 22 when each is not currently being utilized, thereby not disrupting the operator's use of the welding power source 12. The supervising circuitry 14 may transition between modes to turn on or turn off various power supplies 24 based at least in part on a value of a timer. The timer may be reset by the weld signal. For example, the supervising circuitry 14 may close the weld switch 74 and re-enter the welding mode upon receipt of the weld signal. In some embodiment, the supervising circuitry 14 progressively turns off more components of the welding power source 12 as the value of the timer increases. For example, the supervising circuitry 14 may enter the accessory mode when the weld signal stops, enter the monitoring mode after an idle delay period has elapsed since entering the accessory mode, and enter a shut down mode to shut down the welding power source after a monitoring delay period has elapsed since entering the monitoring mode. In some embodiments, the idle delay period may be less than or equal to approximately 30 seconds, 1 minute, 2 minutes, 5 minutes, 10 minutes, or minutes. In some embodiments, the monitoring delay period may be less than or equal to approximately 1 minute, 5 minutes, 10 minutes 15 minutes, 30 minutes, or 1 hour. The idle delay period and/or the monitoring delay period may be adjusted via the operator interface 28.

Figure 3:
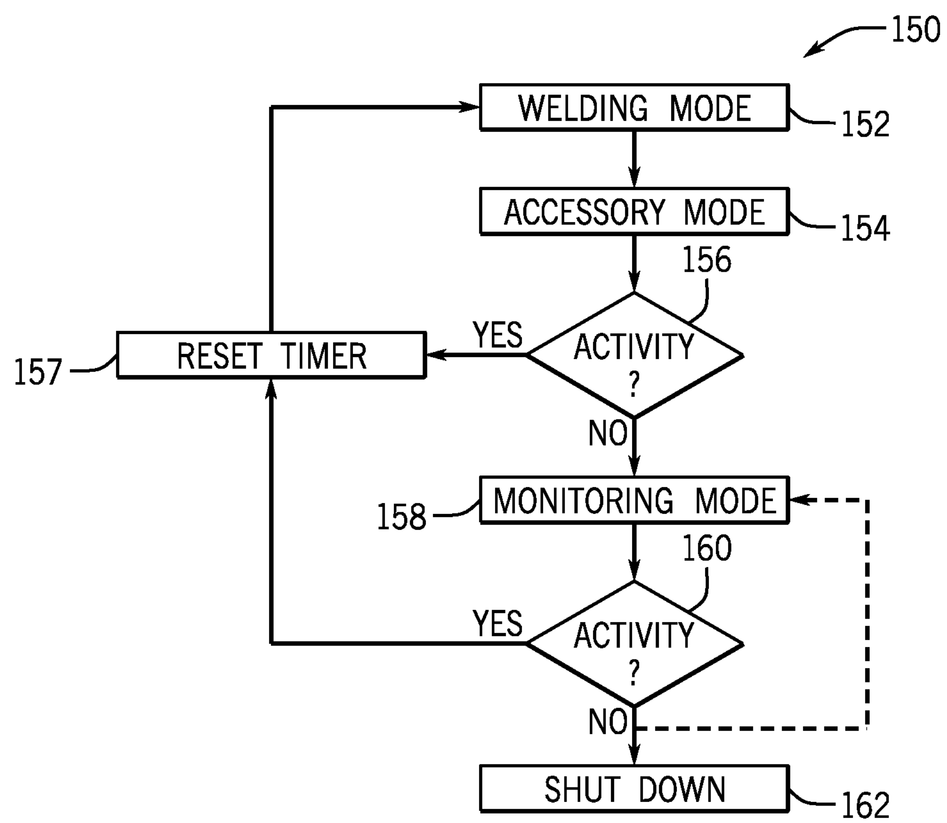
FIG. 3 is a flow chart of an embodiment of a method for operating the welding power source having the supervising circuitry.

FIG. 3 illustrates a flowchart of an embodiment of a method 150 for operating the welding power source 12 described above. The supervising circuitry may be in a welding mode (block 152) while performing a welding operation. In some embodiments of the welding mode, the supervising circuitry may generally distribute the input power to the power conversion circuitry and any accessory or welding accessory that may be used concurrently. The supervising circuitry may enter the welding mode (block 152) upon receiving a weld signal, such as a signal from actuating a trigger on the weld torch.

The supervising circuitry may enter an accessory mode (block 154) when the trigger is released and the weld signal stops. In the accessory mode, the supervising circuitry stops distributing the input power to the power conversion circuitry as weld input, turning the power conversion circuitry off. The supervising circuitry may also stop distributing the input power to one or more other power supplies (e.g., welding accessory power supplies) of the welding power source in the accessory mode based at least in part on idle settings defined in instructions or input through the operator interface.

Entering the accessory mode may start a timer. The supervising circuitry determines (node 156) whether a weld signal is received prior to timer increasing to be substantially equal to the idle delay period. If the weld signal is received, the timer is reset (block 157) and the supervising circuitry re-enters the welding mode (block 152). If the weld signal is not received and the value of the timer is approximately equal to the idle delay period, then the supervising circuitry enters the monitoring mode (block 158).

In the monitoring mode, the supervising circuitry may stop distributing the input power to all the power supplies except for the background power supply and certain power supplies (e.g., auxiliary power supply) selected by the operator to remain turned on. In some embodiments of the monitoring mode, the supervising circuitry may only distribute the input power as the background power to the background power supply. Entering the monitoring mode may restart the timer or compare the timer to a different period (e.g., monitoring delay period). The supervising circuitry may determine (node 160) whether a weld signal is received prior to the timer increasing to be substantially equal to the monitoring delay period. If the weld signal is received, the timer is reset (block 157) and the supervising circuitry re-enters the welding mode (block 152). If the weld signal is not received and the timer is substantially equal to the monitoring delay period, then the supervising circuitry may shut down (block 162) the welding power source or remain in monitoring mode (block 158).

Figure 4:
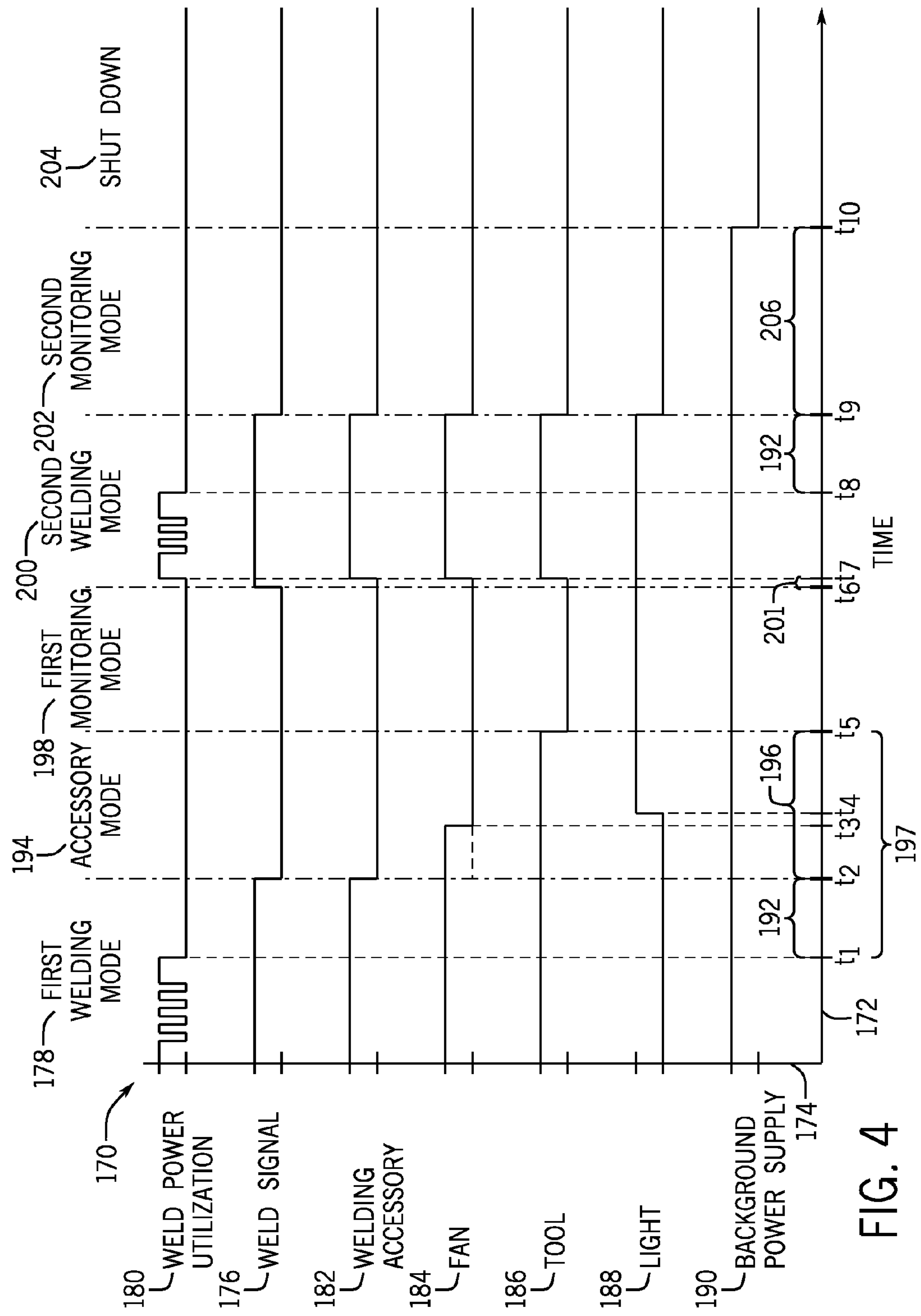
FIG. 4 is a timing diagram of an embodiment of the supervising circuitry distributing input power within the welding power source.

FIG. 4 illustrates a timing diagram 170 of an embodiment of the supervising circuitry as it distributes the input power during operation of the welding power source. The supervising circuitry may distribute the input power to the components within the welding power source according to the present mode. The x-axis of the timing diagram 170 indicates time 172 and the y-axis lists a series of signals 174 related to the welding power source, each of which are shown with a high value or a low value. A high value weld signal 176 places the supervising circuitry into the first welding mode 178, enabling the supervising circuitry to distribute the input power as weld input to the power conversion circuitry. The power conversion circuitry converts the weld input to weld power used in a welding process. The timing diagram 170 illustrates weld power utilization 180 with a high value to indicate when an operator is forming a weld (e.g., striking an arc), and a low value to indicate when the operator is not forming a weld.

In the timing diagram 170, high values of the welding accessory signal 182, the fan signal 184, the tool signal 186, the light signal 188, and the background power supply signal 190 indicate that the supervising circuitry has turned on and is distributing input power to the corresponding component in the present mode as described below. That is, a high value of the welding accessory signal 180 indicates that a corresponding welding accessory is turned on and is receiving welding accessory power. A high value of the light signal 186 indicates that a corresponding light is turned on and is receiving accessory power. In the timing diagram 170, the supervising circuitry in the first welding mode 178 distributes input power to turn on the power conversion circuitry, a welding accessory (e.g., wire feeder), a fan (e.g., conversion fan), a tool (e.g., grinder), and the background power supply.

The welding process may stop at time $t_1$, such as when the operator sets down the torch. In some embodiments, the weld signal 176 stops at time $t_2$ after a weld delay 192, directing the supervising circuitry to transition from the first welding mode 178 to an accessory mode 194. The duration of the weld delay 192 may be defined in the supervising circuitry or adjusted by the operator, such as via the operator interface. The weld delay 192 may be approximately 30 seconds, 1 minute, 3 minutes, 5 minutes, 10 minutes, 15 minutes, or more, which may be convenient for an operator that frequently stops and starts welding operations. In some embodiments, the weld delay 192 is less than approximately 30 seconds, 15 seconds, or even approximately 0 seconds, which may reduce power consumption of the welding power source after a relatively short weld delay 192. Upon entering the accessory mode 194, the supervising circuitry turns off the power conversion circuitry, and may also turn off the welding accessory power. Accordingly, the supervising circuitry in the accessory mode may reduce the power consumption of the welding power source and/or the EMI by turning off the power conversion circuitry and welding accessory power supplies. In some embodiments, the supervising circuitry turns off the conversion fan upon entering the accessory mode 194 or after the power conversion circuitry is sufficiently cool (e.g., at time $t_3$). The supervising circuitry in accessory mode 194 may distribute accessory power to accessories. In the accessory mode 194 of the timing diagram 170, the supervising circuitry continues to supply accessory power to a tool used in the first welding mode 178, and the operator may turn on or plug in a light at time $t_4$ as shown by the high value light signal 188. The supervising circuitry in the accessory mode 194 also continues to distribute background power to the background power supply.

After an idle delay period 196 without receiving a high value of the weld signal 176, the supervising circuitry transitions from the accessory mode 194 to the first monitoring mode 198 at $t_5$. In the first monitoring mode 198 of the timing diagram 170, the supervising circuitry stops distributing the input power to components of the welding power source except for the background power supply. In some embodiments, the light may remain turned on in the first monitoring mode 198 due to an operator input via the operator interface for the light to remain turned on through the first monitoring mode 198. In the first monitoring mode 198, the supervising circuitry may wait for a high value weld signal 176, such as when the operator actuates the trigger of the torch or picks up the torch. The supervising circuitry is configured to transition from the first monitoring mode 198 to the second welding mode 200 to turn on the power conversion circuitry, welding accessories, and accessories on demand upon receiving the high value weld signal 176.

Upon receiving the high value weld signal 176 at time $t_6$, the supervising circuitry transitions from the first monitoring mode 198 to the second welding mode 200. As described above with the first welding mode 178, the supervising circuitry in the second welding mode 200 distributes input power to turn on the power conversion circuitry, the welding accessory (e.g., wire feeder), the fan (e.g., conversion fan), and the tool (e.g., grinder) at $t_7$. A charge delay 201 between $t_6$ and $t_7$ may be less than or equal to approximately 1, 0.5, 0.2, or 0.08 seconds. In some embodiments, the bus capacitor of the power conversion circuitry is charged between $t_6$ and $t_7$. The operator may resume welding operations and/or resume using the accessory (e.g., tool) after time $t_7$. The supervising circuitry in the second welding mode 200 continues to distribute the input power to the background power supply and to the light.

The welding operation during the second welding mode 200 may stop at time $t_8$ as shown in the timing diagram 170. The weld signal 176 may stop at time $t_9$ after a weld delay 192 from the time $t_8$. The weld delay 192 shifts the weld signal 176 to the low value and directs the supervising circuitry to transition from the second welding mode 178 to another mode. In the timing diagram 170, the supervising circuitry transitions from the second welding mode 200 to a second monitoring mode 202 without transitioning to an accessory mode 194 (e.g., the accessory delay 196 is zero). Upon entering the second monitoring mode 202, the supervising circuitry turns off the power conversion circuitry, the welding accessory, the fan, the tool, and the light. In some embodiment, only the background power supply remains on in the second monitoring mode 202.

In some embodiments of the monitoring modes 198 or 202, the supervising circuitry may transition to a shut down mode 204 at a time $t_{10}$ after a monitoring delay 206 from entering the second monitoring mode 202. In the shut down mode 204, the supervising circuitry may turn off the background power supply to shut down the welding power source. In the shut down mode 204, the supervising circuitry may turn off each component of the welding power source. The monitoring delay 204 may be less than approximately 1, 5, 10, 15, 30, 60, or 90 minutes or more. The operator may adjust and/or eliminate the monitoring delay 204 via the operator interface. The duration of the monitoring delay 204 may also be defined in the supervising circuitry.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A welding power source configured to receive an input power, comprising:
- a plurality of components comprising power conversion circuitry and a background power supply;
- a weld switch coupled to the power conversion circuitry, wherein the weld switch is configured to control distribution of the input power to the power conversion circuitry; and
- supervising circuitry coupled to the weld switch, wherein the supervising circuitry is configured to operate in a plurality of modes, and the supervising circuitry is configured to distribute the input power to the plurality of components based at least in part on a mode of the plurality of modes, wherein the plurality of modes comprises:
  - a welding mode configured to distribute the input power to the power conversion circuitry and to the background power supply, wherein the supervising circuitry is configured to close the weld switch to distribute the input power to the power conversion circuitry when the supervising circuitry is operating in the welding mode; and
  - a monitoring mode configured to distribute the input power to the background power supply, and to not distribute the input power to the power conversion circuitry, wherein the supervising circuitry is configured to open the weld switch when the supervising circuitry is operating in the monitoring mode.

2. The welding power source of claim 1, wherein the plurality of components comprises an accessory power supply, wherein the plurality of modes comprises an accessory mode configured to distribute the input power to the accessory power supply, to the background power supply, and not to the power conversion circuitry, wherein the supervising circuitry is configured to open the weld switch when the supervising circuitry is operating in the accessory mode.

3. The welding power source of claim 2, wherein the supervising circuitry is not configured to distribute the input power to the accessory power supply when the supervising circuitry is operating in the monitoring mode.

4. The welding power source of claim 2, wherein the plurality of components comprises a welding accessory power supply, the supervising circuitry is configured to distribute the input power to the welding accessory power supply when the supervising circuitry is operating in the welding mode, and the supervising circuitry is configured to not distribute the input power to the welding accessory power supply when the supervising circuitry is operating in the accessory mode and the monitoring mode.

5. A welding system, comprising:
- a welding torch configured to transmit a weld signal, wherein the weld signal is based at least in part on a demand for a weld process; and
- a welding power source configured to receive an input power, wherein the welding power source comprises:
  - power conversion circuitry configured to receive the input power as a weld input, and to convert the weld input into weld power when turned on, wherein the weld power is provided to the welding torch;
  - a weld switch coupled to the power conversion circuitry, wherein the weld switch comprises an opened position configured to turn on the power conversion circuitry, and the weld switch comprises a closed position configured to turn off the power conversion circuitry;
- a background power supply configured to convert the input power into background power to provide to control circuitry when turned on, wherein the control circuitry is configured to control the power conversion circuitry; and
- supervising circuitry configurable in a plurality of modes based at least in part on the weld signal, wherein the plurality of modes comprises:
  - a welding mode configured to:
    - control the weld switch to the closed position to turn on the power conversion circuitry; and
    - turn on the background power supply; and
  - a monitoring mode configured to:
    - control the weld switch to the opened position to turn off the power conversion circuitry; and
    - to turn on the background power supply.

6. The welding system of claim 5, wherein the power conversion circuitry comprises a switched-mode power supply, a transformer, a generator, or any combination thereof.

7. The welding system of claim 5, wherein the supervising circuitry comprises a timer configured to measure a delay value in the demand for the weld process, the supervising circuitry is configured in the welding mode when the delay value is approximately less than a welding delay, and the supervising circuitry is configured in the monitoring mode when the delay value is approximately greater than or equal to the welding delay.

8. The welding system of claim 5, wherein the welding power source comprises an accessory power supply configured to convert the input power into accessory power to provide to one or more accessories when turned on, wherein the supervising circuitry is configurable in an accessory mode, and the accessory mode is configured to:
- control the weld switch to the opened position to turn off the power conversion circuitry;
- to turn on the background power supply; and
- to turn on the accessory power supply.

9. The welding system of claim 8, wherein the monitoring mode is configured to turn on the accessory power supply to provide accessory power to a subset of the one or more accessories, wherein the subset is defined through an operator interface.

10. The welding system of claim 8, wherein the one or more accessories comprise one or more lights, one or more tools, one or more motors, one or more electronic devices, or any combination thereof.

11. The welding system of claim 5, wherein the welding power source comprises a welding accessory power supply configured to convert the input power into welding accessory power to provide to one or more welding accessories when the welding accessory power supply is turned on, wherein the welding mode is configured to turn on the welding accessory power supply, and the monitoring mode is configured to turn off the welding accessory power supply.

12. The welding system of claim 11, wherein the one or more welding accessories comprise a wire feeder, a heater, or a coolant system, or any combination thereof.

13. The welding system of claim 5, wherein the welding torch comprises a trigger and the torch is configured to transmit the weld signal in response to actuation of the trigger.

14. A method of operating a welding power source, comprising:
- entering a welding mode of supervising circuitry of the welding power source, wherein the supervising circuitry is configured to close a weld switch to provide a weld input to power conversion circuitry to turn on the power conversion circuitry when the supervising circuitry is operating in the welding mode, and the supervising circuitry is configured to provide background power to background circuitry when the supervising circuitry is operating in the welding mode, wherein the power conversion circuitry converts the weld input into weld power for a weld process when the power conversion circuitry is turned on;

utilizing the weld power for the weld process;

starting a timer when an operator stops utilizing the weld power for the weld process; and entering a monitoring mode of the supervising circuitry when a value of the timer is approximately greater than or equal to a welding delay, wherein the supervising circuitry is configured to open the weld switch to turn off the power conversion circuitry when the supervising circuitry is operating in the monitoring mode, and the supervising circuitry is configured to provide background power to the background circuitry when the supervising circuitry is operating in the monitoring mode.

15. The method of claim 14, comprising receiving a weld signal, wherein the weld signal is configured to reset the timer when the supervising circuitry is operating in the welding mode, and the weld signal is configured to transition the supervising circuitry to the welding mode when the supervising circuitry is operating in the monitoring mode.

16. The method of claim 14, wherein the supervising circuitry is configured to provide accessory power to an accessory power supply to turn on the accessory power supply when the supervising circuitry is operating in the welding mode, and the supervising circuitry is configured to turn off the accessory power supply when the supervising circuitry is operating in the monitoring mode.

17. The method of claim 16, comprising entering an accessory mode when the value of the timer is approximately greater than or equal to an idle delay, wherein supervising circuitry is configured to provide background power to the background circuitry when the supervising circuitry is operating in the accessory mode, the supervising circuitry is configured to provide accessory power to the accessory power supply when the supervising circuitry is operating in the accessory mode, and the supervising circuitry is configured to open the weld switch to turn off the power conversion circuitry when the supervising circuitry is operating in the accessory mode, wherein the idle delay is less than the welding delay.

18. The method of claim 14, wherein the supervising circuitry is configured to provide welding accessory power to a welding accessory power supply to turn on the welding accessory power supply when the supervising circuitry is operating in the welding mode, the welding accessory power supply is configured to transmit the welding accessory power to one or more welding accessories when the welding accessory power supply is turned on, and the supervising circuitry is configured to turn off the welding accessory power supply when the supervising circuitry is operating in the monitoring mode.

19. The method of claim 14, comprising entering a shut down mode of the supervising circuitry when the value of the timer is approximately greater than a monitoring delay, wherein the supervising circuitry is configured to open the weld switch to turn off the power conversion circuitry when the supervising circuitry is operating in the shut down mode, and the supervising circuitry is configured to turn off the background circuitry when the supervising circuitry is operating in the shut down mode, wherein the monitoring delay is greater than the welding delay.

20. The method of claim 14, comprising adjusting the welding delay based at least in part on an operator input.

* * * * *